United States Patent [19]

Schimmel et al.

[11] 4,298,511

[45] Nov. 3, 1981

[54] URETHANE RHEOLOGY MODIFIERS AND COMPOSITIONS CONTAINING SAME

[75] Inventors: Karl F. Schimmel, Verona; Jerome A. Seiner, Pittsburgh; Rostyslaw Dowbenko; Roger M. Christenson, both of Gibsonia, all of Pa.

[73] Assignee: PPG Industries, Inc., Pittsburgh, Pa.

[21] Appl. No.: 174,479

[22] Filed: Aug. 1, 1980

[51] Int. Cl.$^3$ ............................................. C08G 18/48
[52] U.S. Cl. .............................. 260/29.2 TN; 260/13; 260/30.2; 260/32.4; 260/32.6 NR; 260/33.2 R; 260/30.4 N; 525/123; 525/452; 528/76
[58] Field of Search ................ 260/13, 29.2 TN, 30.2, 260/30.4 N, 32.4, 32.6 NR, 33.2 R; 521/65, 99, 134, 135, 136, 137, 160, 174, 176; 525/123, 452; 528/76

[56] References Cited

U.S. PATENT DOCUMENTS

| | | | |
|---|---|---|---|
| 2,929,800 | 3/1960 | Hill | 260/32.6 NR |
| 3,326,821 | 6/1967 | Lesser | 521/176 |
| 3,483,167 | 12/1969 | Sommer et al. | 528/76 |
| 3,857,800 | 12/1974 | Fishbein et al. | 521/176 |
| 3,939,123 | 2/1976 | Matthews et al. | 528/76 |
| 4,061,618 | 12/1977 | Stanley et al. | 260/29.2 TN |
| 4,118,354 | 10/1978 | Harada et al. | 260/29.2 TN |
| 4,131,604 | 12/1978 | Szycher | 528/76 |
| 4,134,610 | 1/1979 | Lindewall | 521/176 |
| 4,155,892 | 5/1979 | Emmons et al. | 260/29.2 TN |
| 4,180,491 | 12/1979 | Kim et al. | 260/29.2 TN |

Primary Examiner—Maurice J. Welsh
Attorney, Agent, or Firm—Charles R. Wilson

[57] ABSTRACT

Rheology modifiers useful in water-and organic solvent-based compositions are derived from the reaction of polyalkylene oxide, polyfunctional material, diisocyanate and water. The modifiers are characterized by having a branched structure and containing substantially no terminal hydrophobic groups.

44 Claims, No Drawings

URETHANE RHEOLOGY MODIFIERS AND COMPOSITIONS CONTAINING SAME

BACKGROUND OF THE INVENTION

This invention relates to rheology modifiers. More particularly, the invention relates to urethane rheology modifiers especially useful in water and organic solvent-based compositions.

Additives have long been used in coating compositions for various purposes. Thus, viscosity control agents, surfactants, sag-control agents, anti-foaming agents and other materials are added to coating compositions in minor amounts for their respective functions. Rheology modifiers are also added to such compositions not only for increasing the viscosity of the coating composition but to maintain the viscosity at desired levels under varying process conditions and end-use situations. Secondary effects obtained from the rheology modifiers include protective colloidal action, improvement in pigment suspension, leveling and flow. Some of these properties are also desired in similar type compositions, for instance textile treating compositions, cosmetics, paper compositions, well drilling, firefighting foams, detergents, pharmaceuticals, agricultural formulations, and emulsions of all kinds. It can be seen rheology modifiers are used in a variety of compositions.

Many well-known rheology modifiers are used with varying degrees of success. Thus, natural products such as the alginates, casein, and gum tragacanth and modified natural products such as methyl cellulose and hydroxyethyl cellulose are useful rheology modifiers. Synthetic rheology modifiers have also been used. These materials include the carboxyvinyl ether copolymers, acrylic polymers and maleic anhydride/styrene copolymers. However, the known rheology modifiers have various deficiencies. Thus, the natural rheology modifiers are susceptible to biological attack. Synthetic rheology modifiers are not subject to such attack yet most of them do suffer from having less than desirable thickening qualities over a wide range of end uses and/or film forming concentrations.

There is accordingly a need for rheology modifiers which are biologically resistant as well as function over a wide range of uses and temperatures. Ideally, such rheology modifiers can be used in water-base as well as organic solvent based systems and can be used with a wide range of different film forming resins. An added benefit would be if the rheology modifiers imparted many of the secondary properties described above.

As used herein, all percents and ratios are by weight unless otherwise stated.

SUMMARY OF THE INVENTION

Disclosed herein are rheology modifiers derived from the reaction product of from about 8 to about 14 moles of a polyalkylene oxide, from about 0.5 to about 5 moles of a polyfunctional material, from about 9 to about 90 moles of a diisocyanate and from about 3 to about 70 moles water. The rheology modifiers are substantially free of isocyanate groups and have a branched structure.

The aforedescribed rheology modifiers are useful in water-based as well as organic solvent-based compositions. The rheology modifiers are especially useful in coating compositions.

DETAILED DESCRIPTION OF THE INVENTION

The following paragraphs describe the rheology modifiers, their method of making and various applications thereof.

The rheology modifiers useful herein are derived from the reaction of polyalkylene oxides, polyfunctional materials, diisocyanates and water. The modifiers have a branched chain structure and are substantially free of isocyanate groups. The rheology modifiers are further characterized by having substantially no terminal hydrophobic groups.

Polyalkylene oxides used in the reaction include the polyethylene oxide diols, polypropylene oxide diols, polybutylene oxide diols and polyisobutylene oxide diols. These materials have a molecular weight of from about 2,000 to about 20,000, preferably from about 4000 to about 12,000. The polyethylene oxide is a preferred polyalkylene oxide. The reaction mixture consists essentially of from about 8 moles to about 14 moles, preferably, from about 9 moles to about 12 moles of the polyalkylene oxide.

The polyfunctional material has either at least 3 active hydrogens and is capable of reacting with an isocyanate or is a polyisocyanate with at least 3 isocyanate groups. Classes of materials useful as the polyfunctional material include polyols, amines, amine alcohols, thiols and polyisocyanates. The preferred polyfunctional material is a polyol having a hydroxyl functionality of at least three. Examples of such materials include the polyalkylols, e.g., trimethylolpropane, trimethylolethane and pentaerythritol; the polyhydroxyalkanes, e.g., glycerol, erythritol, sorbitol, and manitol; polyhydric alcohol ethers such as those derived from the aforementioned alcohols and alkylene oxides; cycloaliphatic polyhydric compounds, e.g., trihydroxyl cyclohexanes; and aromatic compounds such as trihydroxybenzene. Preferred polyols are the trifunctional alcohols, especially the trimethylolpropane. Additional examples of polyfunctional materials include diethylenetriamine; triethylenetetramine; diethanolamine; triethanolamine; triisopropanolamine; trimercaptomethylpropane; triphenyl methane-4,4,'4''-trisocyanate; 1,3,5-triisocyanate benzene; 2,4,6-triisocyanate toluene; 4,4'-diphenyl-dimethyl methane-2,2'-5,5'-tetraisocyanate; and hexamethylene diisocyanate trimer, such as Mobay Chem. Co's Desmodur N. The level of polyfunctional material ranges from about 0.5 moles to about 5 moles, preferably from about 1 mole to about 3 moles of the reaction mixture.

A third component used in the reaction mixture is a diisocyanate at a level of from about 9 moles to about 90 moles, preferably from about 20 moles to about 35 moles. Several different hydrocarbon or substituted hydrocarbon diisocyanates are useful including the aliphatic, cycloaliphatic and aromatic diisocyanates either alone or in admixture. Generally available diisocyanates have the formula OCNRNCO where R is arylene, e.g., phenylene and diphenylene; alkylarylene, e.g., dimethylbiphenylene, methylenebisphenyl and dimethylmethylenebisphenylene; alkylene, e.g., methylene, ethylene, tetramethylene, hexamethylene, a 36 methylene species, and trimethylhexylene; and alicyclic, e.g., isophorone and methylcyclohexylene. Still other useful diisocyanates include those of the above formula where R is a hydrocarbon group containing ester or ether linkages. Specific examples of suitable diisocyanates include 1,4-tetramethylene diisocyanate; 1,6-hexamethylene diisocyanate; 2,2,4-trimethyl-1,6-diisocyanato hexane; 1,10-decamethylene diisocyanate; 1,4-cyclohexylene diisocyanate; 4,4'-methylene bis (isocyanato cyclohexane); p-phenylene diisocyanate; 2,6-toluene diisocyanate; 2,4-toluene diisocyanate; xylene diisocyanate; isophorone diisocyanate; bis para-isocyanato cyclohexylmethane; 4,4-biphenylene diisocyanate; 4,4-methylene diphenyl isocyanate; 1,5-napthalene diisocyanate; and 1,5-tetrahydronapthalene diisocyanate. Preferred are the toluene diisocyanate and the cycloaliphatic diisocyanates, especially isophorone diisocyanate and bis para-isocyanato cyclohexylmethane.

A fourth component used in the reaction mixture is water. The water is used at a level of from about 3 moles to about 70 moles. Preferably from about 5 moles to about 38 moles and most preferably from about 8 moles to about 25 moles of the water is used. It should be understood that oftentimes the components other than the diisocyanate used in the reaction as well as any solvent medium used will contain water, usually in trace amounts. It is necessary the water brought into the reaction mixture by these sources be accounted for and adjusted either by partially drying the reaction mixture or adding more water so as to come within the proper level of water as above indicated. The level of water is found critical to forming a rheology modifier having the desired viscosity modifying characteristics. It is theorized the water is responsible for the formation of urea and other groups within the molecule.

Components in addition to those discussed above can be included in the reaction mixture provided they do not interfere with the reaction or materially affect the properties of the resultant rheology modifier. Thus, components such as monofunctional materials, non polyalkylene oxide polyols and lower molecular weight polyols can be included in the reaction mixture at low levels, generally less than about 10% by weight. Preferably, however, the rheology modifiers of this invention are derived solely from the four components discussed in the paragraphs immediately above.

A convenient method of making the rheology modifier is by blending all the components together in the presence of a solvent medium and heating to a temperature ranging from about 100° C. to about 130° C. Alternatively, the components can be individually added in any order and reacted at the aforementioned elevated temperature. The reaction is allowed to proceed until substantially no free isocyanate groups are present. The absence of free isocyanate groups signals the end of the reaction. The aforementioned reactant ratios assure there will be no free isocyanate groups in the reaction mixture provided the reaction is allowed to proceed to completion. Any of several inert solvents can be used as the solvent medium, the only criteria being that all the components be either soluble or dispersible therein. Thus, benzene, toluene, xylene, ethyl acetate, butyl acetate and the dialkyl ethers of ethylene glycol and diethylene glycol can be used. Preferred, however, for use as the solvent medium is an organic solvent which is compatible with a water-based or organic solvent-based coating composition. Compatible solvents are preferred since it is a desired objective that the rheology modifier as made be added directly to a coating composition without a need to remove any incompatible solvent medium used in its preparation. This objective is particularly difficult to meet with water-based coating compositions. Solvents found to be especially compatible with the coating compositions, including the water-based compositions, include 1-methyl-2-pyrolidinone, dimethylformamide, dimethyl acetamide, dimethyl sulfoxide, gamma butyrolactone, gamma butyrolactam, dioxane and acetonitrile.

In a preferred method of making the rheology modifiers, a polyhydric material such as ethylene glycol, propylene glycol, or glycerine is added when the mixture described in the preceding paragraph is substantially free of isocyanate groups. This addition reduces the mixture's viscosity thereby making it easier to handle and further ensures there are no terminal hydrophobic groups in the rheology modifier. For maximum ease of handling, the mixture's temperature is about 100° C. to about 130° C. while the polyhydric material is added.

The aforedescribed modifiers can be used in water-based compositions as well as organic solvent-based compositions. They are most useful in coating compositions, as below described, especially the water-based latex coating compositions.

Latex coating compositions can be made from many different water-insoluble polymeric film-forming materials which are capable of forming a dispersion in water. Especially useful film-forming polymeric resins are the acrylic resins which are the polymerized ester derivatives of acrylic acid and methacrylic acid. The esters are formed by the reaction of acrylic or methacrylic acid with a suitable alcohol, e.g., methyl alcohol, ethyl alcohol, propyl alcohol and butyl alcohol. Generally speaking, the larger the alcoholic portion of the ester, the softer or more flexible the resultant resin. Monomers such as styrene, vinyl toluene, vinyl chloride and vinylidene chloride can be reacted with the acrylic and methacrylic esters to produce resins having excellent properties. Copolymers of acrylic resins with each other or with other monomers of acrylic or methacrylic acids and their derivatives such as methyl acrylate, methyl methacrylate, ethyl acrylate, ethyl methacrylate, butyl acrylate, butyl methacrylate, acrylamide, and acrylonitrile are useful. Still other polymeric resins include the vinyl resins derived from monomers containing a carbon to carbon double bond. These monomers polymerize by linear addition to form long-chain molecules. The vinyl monomers can have various pendant groups such as chlorine, acetate and aromatic groups. The vinyl resins are commonly derived from monomers such as vinyl chloride vinylidine chloride, vinyl acetate, styrene, acrylonitrile and mixtures thereof.

The water-insoluble polymeric resins have a particle diameter of less than about 1 micron, preferably from about 0.05 microns to about 0.5 microns and are suspended in water. These compositions are oftentimes referred to as either emulsions or latexes. A typical latex coating composition contains from about 5% to about 70%, preferably from about 20% to about 35% of the aforedescribed film-forming polymeric resins and from about 0.1% to about 10%, preferably from about 1% to about 5%, based on the film-forming of polymeric resin, of the rheology modifier.

Other film-forming resins which can be either water-solubilized or dissolved in organic solvents include the epoxy, vinyl, alkyd, polyester, acrylic, aminoplast, phenoplast, cellulose derivatives, amide or urethane resins or mixtures thereof. Copolymers derived from such resins are also useful. These resins are further described in commonly assigned U.S. Ser. No. 166,643, filed July 7, 1980 P. Group 140 Becher et al, "Pigment Dispersants for Coating Compositions", the disclosure of which is herein incorporated by reference.

Several different organic solvents can be used as a liquid carrier for the coating compositions. Examples of such solvents include hydrocarbons and halogenated hydrocarbons such as toluene, xylene, mineral spirits, hexane, cyclohexane, chlorobenzene and perchloroethylene.

Additives commonly used in coating compositions can be used. Such additives include plasticizers, fillers, surfactants, stabilizers and pigments.

The coating compositions are applied by conventional coating techniques onto a variety of substrates. Thus the compositions can be applied by spraying, dipping, brushing, flowcoating and rollcoating. Substrates that can be coated include wood, metals, glass, plastics, and wallboard.

The examples which follow are illustrative of the invention.

EXAMPLE I

A rheology modifier is derived from the following reactants according to the procedure set out below:

|  | Molar ratio |
| --- | --- |
| Polyethylene oxide (M.W. 8000) | 11 |
| Trimethylolpropane | 2 |
| Bis para-isocyanato cyclohexylmethane | 23.9 |
| Water | 12.6 |

A reaction vessel is initially charged with 398 parts 1-methyl-2-pyrrolidinone (M-pyrol), 500 parts polyethylene oxide (available from Union Carbide Corp. as Carbowax 6000) and 1.5 parts trimethylolpropane. The reaction vessel is now heated to 105° C. A sample of the mixture shows there to be 1.2 parts water present. A 1% dibutyl tin dilaurate catalyst solution in M-pyrol is then added at a level of 9.9 parts while maintaining the reaction temperature at 110° C. Thirty-five and six tenths (35.6) parts of bis para-isocyanato cyclohexylmethane (available from E. I. Dupont de Nemours and Co. as Hylene W) is next added using an isocyanate pump, followed by a rinse with 14 parts M-pyrol. After about a three-hour hold period, 4 additional parts of the M-pyrol is added followed by an addition of 2167 parts propylene glycol. The viscosity of the mixture is determined to be Z-6. After another hold period of about $\frac{1}{2}$ hours at 105° C., 549 parts deionized water is added. The final reaction mixture has a viscosity of Z-3-4 and a 14.8% solids content.

EXAMPLE II

Another rheology modifier of this invention is made from the following reactants:

|  | Mole ratio |
| --- | --- |
| Polyethylene oxide (M.W. 8000) | 11 |
| Tetraol[1] | 1.5 |
| Bis para-isocyanato cyclohexylmethane | 34.6 |
| Water | 23.3 |

[1]Reaction product of pentaerythritol and 8 moles propylene oxide, available from BASF Wyandotte Co. as PEP-650.

A reaction vessel is initially charged with 500 parts of polyethylene oxide (Carbowax 6000), 5.1 parts of the tetraol and 400 parts M-pyrol. The water content is 0.8 parts. The reaction mixture is heated to 110° C., at which time 10.0 parts of a 1% solution of dibutyl tin diluarate is added. Next 39.4 parts of bis para-isocyanato cyclohexylmethane (Hylene W) and 18.5 additional parts M-pyrol are added over a 15 minute period while maintaining the temperature at about 105°–110° C. The mixture is held for about two hours until a sample has a Z-6 to Z-7 viscosity in 25% M-pyrol. At this point, 12.1 parts of additional diisocyanate is added and the mixture held at 110° C. until a Z-6 viscosity in 25% M-pyrol is obtained. Next 2156 parts propylene glycol is added, followed by a 501 parts deionized water add.

The resultant rheology modifier has a Z-3 to Z-4 viscosity and a 15% solids content.

EXAMPLE III

This example illustrates the effect different rheology modifiers have on the viscosity of a coating composition where the modifiers differ from one another only in the amount of water used in their preparation. Following the procedure found in Example I, four rheology modifiers are made. In all instances, the reaction mix is stripped of all water prior to addition of the diisocyanate. Any water contained in the added diisocyanate is accounted for in the below stated amounts.

|  | A | B | C | D |
| --- | --- | --- | --- | --- |
| Polyethylene oxide (M.W. = 8000) | 11 | 11 | 11 | 11 |
| Trimethylolpropane | 2 | 2 | 2 | 2 |
| Bis para-isocyanato cyclohexylmethane | 15.3 | 24.5 | 28.2 | 30.9 |
| Water (% by weight) | 2.6 | 12.6 | 16.0 | 18.0 |

The above rheology modifiers are tested using the following coating composition.

|  | Parts by Weight |
| --- | --- |
| Acrylic latex[1] | 368 |
| Rheology modifier solution (15% solids) | 50 |
| Water | 148 |
| Amino methyl propanol | 1 |
| Dispersant[2] | 2 |
| Surfactant[3] | 12 |
| Defoamer[4] | 8 |
| Phenyl mercuric acetate | 0.5 |
| Calcium carbonate | 119 |
| Barium sulfate | 190 |
| Hydroxyethyl cellulose | 2 |
| Coalescent[5] | 12 |
| Ethylene glycol | 15 |
| Clay slurry (68% solids) | 104 |

[1]Available from Rohm & Haas Co. as AC-490, 46.5% solids
[2]Available from Rohm & Haas Co. as Tamol 731
[3]A blend of Strodex SEB-30 (Dexter Chem. Co.), Igepal COQ10 (General Amiline & Film Corp.) and Triton GR-7M (Rohm & Haas Co.), in a 2:8:2 ratio.)
[4]Available from Drew Chem. Co. as DREW L-475.
[5]Available from the Dow Chem. Co. as Dalpad A.

Viscosities of the above coating composition where rheology modifiers A-D are separately used are as follows:

| Rheology modifier | Viscosity of Composition (centipoises) |
| --- | --- |
| A | 900 |
| B | 2900 |
| C | 5000 |
| D | 8500 |

EXAMPLE IV

This example illustrates the effect of varying levels of a rheology modifier on a latex coating composition. The compositions are as follows:

|  | Parts by Weight | | |
|---|---|---|---|
|  | A | B | C |
| Polyvinyl acetate latex[1] | 261.6 | 261.6 | 261.6 |
| Rheology modifier solution of Example I (15% solids) | — | 60.0 | 45.0 |
| Water | 275.3 | 220.3 | 234 |
| Defoamer[2] | 6.0 | 6.0 | 6.0 |
| Hydroxyethyl cellulose | 4.6 | — | — |
| Coloidal silicate[3] | 3.0 | — | — |
| Amino methyl propanol | 1.1 | 1.1 | 1.1 |
| Mineral spirits | 9.9 | 9.9 | 9.9 |
| 2,2,4-trimethyl-1,3-pentanediol monoisobutyrate | 13.8 | 13.8 | 13.8 |
| Nonionic surfactant[4] | 3.0 | 3.0 | 3.0 |
| Nonionic surfactant[5] | 1.0 | 1.0 | 1.0 |
| Nonionic surfactant[6] | 6.0 | — | — |
| Nonionic surfactant[7] | — | 6.0 | 6.0 |
| Silica[8] | 10.0 | 10.0 | 10.0 |
| Diatomaceous earth | 24.8 | 24.8 | 24.8 |
| Silica[9] | 39.5 | 39.5 | 39.5 |
| Phenyl mercuric acetate | 0.5 | 0.5 | 0.5 |
| Clay slurry (68% solids) | 73.0 | 73.0 | 73.0 |
| Titanium dioxide slurry (61% solids) | 354.9 | 354.9 | 354.9 |

[1]Available from Reichhold Chemicals, Inc. as Walpol 40-143
[2]Available from Diamond Shamrock Co. as Foamaster-S
[3]Available from R. T. Vanderbilt Co., Inc. as Vegum-T
[4]Available from Rohm & Haas Co. as Igepal CA630
[5]Available from Rohm & Haas Co. as Triton X45
[6]Available from Rohm & Haas Co. as Tamol 731
[7]Available from Nopco Chem. Co. as Nopcosperse 44
[8]Available from PPG Industries Inc. as Hi Sil 422
[9]Available from Illinois Mining Co. as Imsil A-25

Viscosities in centipoises of above compositions are as follows:

| Composition | Viscosity (#4 Spindle) |
|---|---|
| A | 22400 (6 rpm) |
|  | 4960 (60 rpm) |
| B | 7200 (6 rpm) |
|  | 2980 (60 rpm) |
| C | 2100 (6 rpm) |
|  | 730 (60 rpm) |

EXAMPLE V

An organic solvent based composition containing a rheology modifier is formulated as follows:

|  | Parts by Weight |
|---|---|
| Long oil/soya alkyd resin | 17.33 |
| Sunflower/soya alkyd resin | 31.09 |
| Rheology modifier solution of Example I (15% solids) | 1.67 |
| Mineral spirits | 13.14 |
| Ethylene glycol monophenyl ether | 1.63 |
| Soya lecithin | 0.42 |
| Cobalt feeder drier | 0.05 |
| Calcium drier | 0.39 |
| Cobalt drier | 0.06 |
| Manganese drier | 0.03 |
| Zirconium drier | 0.62 |
| Surfactant[1] | 0.47 |
| Surfactant[2] | 0.24 |
| Aluminum silicate | 2.33 |
| Silica | 2.27 |
| Calcium carbonate | 15.51 |
| Titanium dioxide | 8.33 |
| Soya oil | 3.25 |
| Methyl ethyl ketoxime | 0.46 |

[1]Available from General Aniline and Film Co. as Igepal CO 430
[2]Available from Atlas Chem. Industries as Atlas G-3300

After 24 hours, the above composition has a Brookfield viscosity using a #4 spindle at 6 and 60 rpm of 6,000 and 1,950 centipoises versus 4,200 and 1,250 centipoises for the same composition without the rheology modifier, thereby demonstrating the utility of the rheology modifiers of this invention in organic solvent-based compositions.

EXAMPLE VI

A rheology modifier of this invention is made using the procedure found in Example I. The reactants are:

|  | Molar ratio |
|---|---|
| Polyethylene oxide (M.W. 8000) | 10.8 |
| Trimethylolpropane | 2 |
| Isophorone diisocyanate | 35.2 |
| Neopentyl glycol adipate[1] | 11.2 |
| Water | 13.0 |

[1]Derived from the reaction of 2 moles neopentyl glycol and 1 mole adipic acid, reacted until an acid number of less than 5 is obtained.

The polyethylene oxide (350 parts), trimethylolpropane (1.1 parts), neopentyl glycol adipate (26.4 parts), M-pyrol (300 parts) and cyclohexane (100 parts) are charged to a reaction vessel and heated to reflux. The water level is checked and adjusted to 0.68 parts. Next, 10 parts of a 1% dibutyl tin dilaurate catalyst solution in M-pyrol is added. The temperature is maintained at 110° C. Over the next ½ hour, 34.8 parts isophorone diisocyanate and 17.3 parts additional M-pyrol are added. When the reaction mixture shows no free isocyanate present, 1886 parts propylene glycol is added. The mixture is cooled to 90° C. and 381 parts water added.

EXAMPLE VII

The rheology modifier of this example contains the following reactants:

|  | Molar ratio |
|---|---|
| Polyethylene oxide (M.W. 8000) | 10.1 |
| Trimethylolpropane | 2 |
| diisocyanate[1] | 16.5 |
| Water | 6.2 |

[1]The diisocyanate is derived from the reaction of 2 moles isophorone diisocyanate and 1 mole of the neopentyl glycol adipate of Example VI.

A reaction vessel set up as in Example I is charged with 369 parts of the polyethylene oxide, 1.1 parts trimethylolpropane, 206 parts M-pyrol and 100 parts cyclohexane. This mixture is heated to strip off water. Enough water is now added back to result in 0.44 parts water. Ten (10) parts of a 1% dibutyl tin dilaurate solution in M-pyrole is added while the mixture is maintained at 110° C. At this point, 186 parts of the diisocyanate and 10 parts M-pyrol rinse are added. The reaction mixture is free of isocyanate after about 5 hours. The viscosity of the mixture is reduced by adding 1760 parts propylene glycol and 414 parts water.

EXAMPLE VIII

This example illustrates the making of a rheology modifier using an amine as the polyfunctional material. The following reactants are used:

|  | Molar ratio |
| --- | --- |
| Polyethylene oxide (MW 8000) | 12.0 |
| Diethanolamine | 2 |
| Bis para-isocyanato cyclohexylmethane | 28.8 |
| Water | 16.6 |

A reaction vessel equipped as in Example I is charged with 385 parts polyethylene oxide, 0.9 parts diethanolamine, 350 parts M-pyrol and 100 parts cyclohexane. The mixture is heated to reflux and then sampled for water content to determine a 0.84 parts content (0.22% based on reactants.) Ten (10) parts of a 1% dibutyl tin dilaurate solution in pyrol is added followed by 27 parts of the diisocyanate and 40 parts pyrol rinse while maintaining the temperature at 110° C. The mixture is allowed to react until analysis shows no free isocyanate groups present (about $2\frac{1}{2}$ hours). Next, 1559 parts propylene glycol is added at 110° C. and then 381 parts water is added to thin the mixture.

EXAMPLE IX

The rheology modifiers of Example VI–VIII are evaluated for their effect on a latex composition by making the following mixtures and measuring their respective viscosities.

|  | Control | % A | B | C |
| --- | --- | --- | --- | --- |
| Rheology modifier of Example VI (15% solids) | — | 6.4 | — | — |
| Rheology modifier of Example VII (15% solids) | — | — | 6.4 | — |
| Rheology modifier of Example VIII (15% solids) | — | — | — | 6.4 |
| Ethylene glycol | 3.5 | 3.5 | 3.5 | 3.5 |
| Ethylene glycol ether monophenyl | 1.7 | 1.7 | 1.7 | 1.7 |
| M-pyrol | 0.9 | — | — | — |
| Propylene glycol | 5.5 | — | — | — |
| Latex resin[1] | 58.6 | 58.6 | 58.6 | 58.6 |
| Water | 29.8 | 29.8 | 29.8 | 29.8 |

[1] Rohm and Haas Co.'s AC-490

|  | Viscosity (centipoises) | | |
| --- | --- | --- | --- |
|  | 6rpm | 60rpm | spindle # |
| Control | 17.5 | 17.5 | #3 |
| Composition A | 2175 | 710 | #2 |
| Composition B | 700 | 550 | #2 |
| Composition C | 6300 | 990 | #2 |

The examples above all show the effectiveness of the rheology modifiers of this invention in both water-based and organic solvent-based compositions.

What is claimed is:

1. A urethane rheology modifier characterized in having a branched structure, substantially no terminal hydrophobic groups and capable of modifying the rheology properties of water-based and organic solvent-based compositions, derived from the reaction of (a) for each from about 8 moles to about 14 moles of a polyalkylene oxide having a molecular weight of from about 2,000 to about 20,000; (b) from about 0.5 moles to about 5 moles of a polyfunctional material; (c) from about 9 moles to about 90 moles of a diisocyanate; and (d) from about 3 moles to about 70 moles water.

2. The rheology modifier of claim 1 wherein the polyfunctional material has at least 3 active hydrogens capable of reacting with isocyanate or is a polyisocyanate having at least 3 isocyanate groups.

3. The rheology modifier of claim 2 wherein the polyfunctional material is selected from the group consisting of polyols, amines, amine alcohols, thiols and polyisocyanates.

4. The rheology modifier of claim 3 wherein the polyfunctional material is a polyol.

5. The rheology modifier of claim 4 wherein the polyol is a trifunctional alcohol.

6. The rheology modifier of claim 5 wherein the trifunctional alcohol is trimethylolpropane.

7. The rheology modifier of claims 1 or 6 wherein the polyalkylene oxide is a polyethylene oxide.

8. The rheology modifier of claim 7 wherein the polyethylene oxide has a molecular weight of from about 4000 to about 12,000.

9. The rheology modifier of claim 8 wherein the diisocyanate is selected from the group consisting of toluene diisocyanate, isophorone diisocyanate, bis para-isocyanato cyclohexylmethane and mixtures thereof.

10. The rheology modifier of claim 1 wherein the rheology modifier is derived from the reaction of (a) for each from about 9 moles to about 12 moles of the polyalkylene oxide; (b) from about 1 mole to about 3 moles of the polyfunctional alcohol; and (c) from about 20 moles to about 35 moles of the diisocyanate.

11. The rheology modifier of claim 10 wherein from about 5 moles to about 38 moles of water is used in the reaction.

12. The rheology modifier of claim 11 wherein from about 8 moles to about 25 moles of water is used in the reaction.

13. The rheology modifier of claim 12 wherein polyethylene oxide, trimethylolpropane, bis para-isocyanato cyclohexylmethane and water are reacted.

14. A process for making a urethane rheology modifier characterized in having a branched structure, substantially no terminal hydrophobic groups and capable of modifying the rheology properties of water-based and organic solvent-based compositions, comprising:

(1) blending (a) for each from about 8 moles to about 14 moles of a polyalkylene oxide having a molecular weight of from about 2,000 to about 20,000, (b) from about 0.5 moles to about 5 moles of a polyfunctional material, (c) from about 9 moles to about 90 moles of a diisocyanate, and (d) from about 3 moles to about 70 moles water in an organic solvent; and (2) reacting the mixture of step (1) until substantially no free isocyanate groups are present, so as to form the rheology modifier.

15. The process of claim 14 wherein the organic solvent is compatible with a water-based coating composition.

16. The process of claim 14 wherein the organic solvent is compatible with an organic solvent-based coating composition.

17. The process of claim 15 wherein the organic solvent is selected from the group consisting of 1-methyl-2-pyrolidinone, dimethylformamide, dimethyl acetamide, dimethyl sulfoxide, gamma butyrolactone, gamma butyrolactam, dioxane, acetonitrile and mixtures thereof.

18. The process of claim 17 wherein the organic solvent is 1-methyl-2-pyrrolidinone.

19. The process of claim 15 wherein a polyhydric material is added after substantially no free isocyanate groups are present.

20. The process of claim 19 wherein the polyhydric material is selected from the group consisting of ethylene glycol, propylene glycol, glycerine, and mixtures thereof.

21. The process of claim 20 wherein the polyhydric material is propylene glycol.

22. The process of claim 19 wherein the temperature of the mixture is maintained at from about 100° C. to about 130° C. while the polyhydric material is added.

23. The process of claim 14 wherein the mixture of step (1) is reacted at a temperature ranging from about 100° C. to about 130° C.

24. The process of claim 14 wherein the polyfunctional material has at least three active hydrogens and is capable of reacting with isocyanate or is a polyisocyanate having at least 3 isocyanate groups.

25. The process of claim 24 wherein the polyfunctional material is selected from the group consisting of polyols, amines, amine alcohols, thiols, polyisocyanates and mixtures thereof.

26. The process of claim 25 wherein the polyfunctional material is a trifunctional alcohol.

27. The process of claim 26 wherein the polyalkylene oxide is a polyethylene oxide having a molecular weight of from about 4,000 to about 12,000.

28. The process of claim 27 wherein the diisocyanate is selected from the group consisting of toluene diisocyanate, isophorone diisocyanate, bis para-isocyanato cyclohexylmethane and mixtures thereof.

29. The process of claim 28 wherein the mixture of step (1) comprises (a) for each from about 9 moles to about 12 moles of the polyalkylene oxide, (b) from about 1 mole to about 3 moles of the polyfunctional material, (c) from about 20 moles to about 35 moles of the diisocyanate and (d) from about 5 moles to about 38 moles of the water.

30. The process of claim 29 wherein the water is present at a level of from about 8 moles to about 25 moles.

31. The process of claim 30 wherein polyethylene oxide, trimethylolpropane, bis para-isocyanato cyclohexylmethane and water are reacted.

32. A coating composition consisting essentially of a film-forming polymeric resin and about 0.1% to about 10%, based on the film-forming polymeric resin solids, of a rheology modifier, said modifier characterized in having a branched structure, substantially no terminal hydrophobic groups, and derived from the reaction of (a) for each from about 8 moles to about 14 moles of a polyalkylene oxide having a molecular weight of from about 2,000 to about 20,000, (b) from about 0.5 moles to about 5 moles of a polyfunctional material; (c) from about 9 moles to about 90 moles of a diisocyanate and; (d) from about 3 moles to about 70 moles water.

33. The composition of claim 32 wherein the polyfunctional material has at least 3 active hydrogens and is capable of reacting with isocyanate or is a polyisocyanate having at least 3 isocyanate groups.

34. The composition of claim 33 wherein the polyfunctional material is selected from the group consisting of polyols, amines, amine alcohols, thiols and polyisocyanates.

35. The composition of claim 34 wherein the polyfunctional material is a polyol.

36. The composition of claim 35 wherein the polyol is a trifunctional alcohol.

37. The composition of claim 36 wherein the trifunctional alcohol is trimethylolpropane.

38. The composition of claims 33 or 37 wherein the polyalkylene oxide is polyethylene oxide having a molecular weight of from about 4000 to about 12,000.

39. The composition of claim 38 wherein the diisocyanate is selected from the group consisting of toluene diisocyanate, isophorone diisocyanate, bis para-isocyanato cyclohexylmethane and mixtures thereof.

40. The composition of claim 32 wherein the rheology modifier is derived from (a) for each about 9 moles to about 12 moles of the polyalkylene oxide; (b) about 1 mole to about 3 moles of the polyfunctional material; (c) about 20 moles to about 35 moles of the diisocyanate and (d) from about 5 moles to about 38 moles water.

41. The composition of claim 40 wherein from about 8 moles to about 25 moles water is used in the reaction.

42. The composition of claim 32 wherein the film-forming resin is an epoxy, vinyl, alkyd, polyester, acrylic, aminoplast, phenolplast, cellulose derivative, amide or urethane resin or mixture thereof.

43. The composition of claim 32 wherein the film-forming resin is a latex resin.

44. The composition of claim 43 wherein the composition contains from about 5% to about 70% of the polymeric film-forming resin.

* * * * *